United States Patent
Uchida (10) Patent No.: US 8,931,266 B2
(45) Date of Patent: Jan. 13, 2015

(54) WORK VEHICLE AND METHOD FOR MANUFACTURING THE SAME

(71) Applicant: Komatsu Ltd., Tokyo (JP)

(72) Inventor: Eiko Uchida, Komatsu (JP)

(73) Assignee: Komatsu Ltd., Tokyo (JP)

( * ) Notice: Subject to any disclaimer, the term of this patent is extended or adjusted under 35 U.S.C. 154(b) by 123 days.

(21) Appl. No.: 13/814,011

(22) PCT Filed: Oct. 2, 2012

(86) PCT No.: PCT/JP2012/075499
§ 371 (c)(1),
(2) Date: Feb. 4, 2013

(87) PCT Pub. No.: WO2014/006769
PCT Pub. Date: Jan. 9, 2014

(65) Prior Publication Data
US 2014/0182730 A1     Jul. 3, 2014

(30) Foreign Application Priority Data

Jul. 2, 2012   (JP) ................................ 2012-148819

(51) Int. Cl.
*F01N 5/04*      (2006.01)
*F16L 3/08*      (2006.01)
*B60K 13/04*     (2006.01)
*F01N 13/20*     (2010.01)
*E02F 9/08*      (2006.01)

(52) U.S. Cl.
CPC . *F16L 3/08* (2013.01); *B60K 13/04* (2013.01); *F01N 13/20* (2013.01); *E02F 9/0866* (2013.01); *E02F 9/0891* (2013.01); *B60Y 2200/415* (2013.01); *Y10S 29/06* (2013.01)

USPC ............... 60/319; 60/272; 60/298; 60/316; 60/317; 60/322; 180/69.2; 180/69.23; 180/296; 180/309; 29/428; 29/DIG. 60; 29/890.08

(58) Field of Classification Search
USPC ........... 60/273, 274, 317, 319, 320, 322, 323, 60/324; 180/69.2, 69.21, 69.23, 69.25, 180/89.18, 89.2, 296, 309; 29/428, DIG. 59, 29/DIG. 60, 890.08, 890.036
See application file for complete search history.

(56) References Cited

U.S. PATENT DOCUMENTS 3,110,239 A  *  11/1963  Dashwood, Jr. ................... 454/4
4,970,859 A  *  11/1990  Yates et al. ....................... 60/324

(Continued)

FOREIGN PATENT DOCUMENTS

| CN | 201225192 Y | 4/2009 |
| JP | 58-84318 U | 6/1983 |
| JP | 2000-213345 A | 8/2000 |
| JP | 3084366 U | 3/2002 |

(Continued)

*Primary Examiner* — Binh Q Tran
(74) *Attorney, Agent, or Firm* — Drinker Biddle & Reath LLP (57) ABSTRACT

A work vehicle includes: a top having a first hole; a plate having a second hole and attached to the top with the second hole in alignment with the first hole; an exhaust pipe having an internal path and a flange projecting outward and abutting against and thus attached to the plate; and a tail pipe having a portion positioned in the first and second holes, and an end in the internal path of the exhaust pipe. The plate is disposed between the top and the flange and serves as a reference in attaching the flange to the top. Thus, a work vehicle that can facilitate disposing an exhaust pipe and a tail pipe concentrically and provide better workability in disposing the exhaust pipe and the tail pipe concentrically, and a method for manufacturing the work vehicle, can be provided.

9 Claims, 8 Drawing Sheets (56) References Cited

U.S. PATENT DOCUMENTS

| | | | |
|---|---|---|---|
| 5,170,020 A * | 12/1992 | Kruger et al. | 181/211 |
| 7,007,720 B1 * | 3/2006 | Chase et al. | 138/110 |
| 8,015,802 B2 * | 9/2011 | Nishiyama et al. | 60/286 |
| 8,720,195 B2 * | 5/2014 | Gardner et al. | 60/319 |

FOREIGN PATENT DOCUMENTS

| | | |
|---|---|---|
| JP | 2002-174108 A | 6/2002 |
| JP | 2005-256794 A | 9/2005 |
| JP | 2010-058765 A | 3/2010 |
| JP | 2010-059749 A | 3/2010 |

* cited by examiner

WORK VEHICLE AND METHOD FOR MANUFACTURING THE SAME

TECHNICAL FIELD

The present invention relates to a work vehicle and a method for manufacturing the same, and particularly to a work vehicle having an exhaust pipe and a method for manufacturing the same.

BACKGROUND ART

A known work vehicle has an engine compartment having a top with an exhaust pipe attached thereto. For example, Japanese Patent Laying-Open No. 2002-174108 (PTL 1) discloses a work vehicle having an exhaust pipe and a muffler having a tail pipe with an end in the exhaust pipe. The tail pipe is inserted into the exhaust pipe through a hole provided through the top of the engine compartment.

CITATION LIST

Patent Literature

PTL 1: Japanese Patent Laying-Open No. 2002-174108

SUMMARY OF INVENTION

Technical Problem

If the tail pipe is disposed in the exhaust pipe at an inappropriate position, the engine compartment's internal heat cannot be discharged efficiently, and the exhaust pipe and the tail pipe also interfere with each other disadvantageously. Accordingly, the exhaust pipe and the tail pipe are required to be disposed concentrically.

The exhaust pipe and the tail pipe are disposed concentrically in a method, as follows: the tail pipe is disposed at the center of a hole of the top, and the exhaust pipe is disposed in alignment with the top. In this method, however, it is difficult to dispose the exhaust pipe and the tail pipe concentrically, since the top, the tail pipe, the exhaust pipe, and other components have different dimensions and are attached at different positions.

In another method, a vehicle has a side door opened to allow a tail pipe to be visually observed, while an exhaust pipe is disposed in alignment with the position of the tail pipe. This method, however, requires two servicepersons, i.e., a serviceperson who opens the side door and visually observes the tail pipe at a side of the engine compartment and another serviceperson who disposes the exhaust pipe at the top of the engine compartment, resulting in impaired workability.

Figure 11:
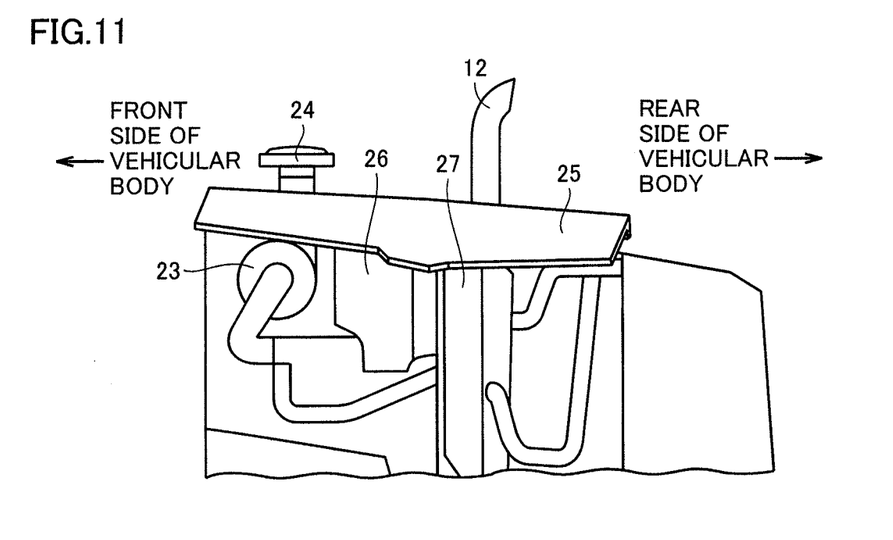
FIG. 11 is a side view schematically showing a rear body with a side door open in one embodiment of the present invention.

Furthermore, when the side door is opened, then, as shown in FIG. 11, in the engine compartment, there are a diaphragm 27 and a thermal guide 26 which insulates the heat generated by an exhaust gas processing device, in front, and it is thus difficult to visually observe the position of the tail pipe and hence position the exhaust pipe and the tail pipe concentrically.

The present invention has been made in view of the above disadvantage, and contemplates a work vehicle that can facilitate disposing an exhaust pipe and a tail pipe concentrically and provide better workability in disposing the exhaust pipe and the tail pipe concentrically, and a method for manufacturing the work vehicle.

Solution to Problem

The present invention provides a work vehicle including: a top having a first hole; a plate having a second hole and attached to the top with the second hole in alignment with the first hole; an exhaust pipe having an internal path and a flange projecting outward and abutting against and thus attached to the plate; and a tail pipe having a portion positioned in the first and second holes, and an end in the internal path of the exhaust pipe. The plate is disposed between the top and the flange and serves as a reference in attaching the flange to the top.

In the present work vehicle, the plate that is disposed between the top and the flange serves as a reference in attaching the flange to the top, so that while the second hole and the tail pipe are positioned concentrically, the plate is used as a reference in attaching the flange to the top to facilitate disposing the exhaust pipe and the tail pipe concentrically. Furthermore, using the plate as a reference in attaching the flange to the top contributes to better workability in disposing the exhaust pipe and the tail pipe concentrically.

In the present work vehicle, the second hole and the tail pipe are disposed concentrically. This allows the plate to serve as a reference in attaching the flange to the top to facilitate disposing the exhaust pipe and the tail pipe concentrically.

In the present work vehicle, the top includes an upper surface inclined with the work vehicle placed on a horizontal ground surface, and the plate and the exhaust pipe are attached to the upper surface inclined. The plate can thus also serve as a reference to allow the exhaust pipe to be attached to the inclined upper surface concentrically with the tail pipe.

The present work vehicle further includes first and second screw members. The first screw member attaches the plate to the top, and the second screw member attaches the exhaust pipe to the top and in doing so the second screw member is not screwed to the plate. This allows the exhaust pipe to be moved relative to the plate and thus attached to the top. The exhaust pipe can thus be easily disposed concentrically with the tail pipe with reference to the plate.

In the present work vehicle, the plate includes an insertion hole for receiving and passing the first screw member therethrough, and the insertion hole and the first screw member have diameters, respectively, having a difference that is equal to a difference between an outer diameter of the tail pipe and a diameter of the internal path of the exhaust pipe. The exhaust pipe can be moved with the first screw member inserted through the insertion hole, and the tail pipe and the exhaust pipe can thus be disposed concentrically.

The present invention provides a method for manufacturing a work vehicle, including the steps of: disposing a top having a first hole and a tail pipe to pass the tail pipe through the first hole; positioning a plate having a second hole on the top to have the second hole concentrically with the tail pipe; and attaching an exhaust pipe having an outwardly projecting flange to the top at the flange with reference to the plate positioned on the top.

In the present method for manufacturing a work vehicle, the plate is positioned on the top to have the second hole concentrically with the tail pipe and the exhaust pipe having a flange has the flange attached to the top with reference to the plate that has been positioned on the top to facilitate disposing the exhaust pipe and the tail pipe concentrically. Furthermore, using the plate as a reference in attaching the flange to the top contributes to better workability in disposing the exhaust pipe and the tail pipe concentrically.

In the present method for manufacturing a work vehicle, in the step of attaching, the flange is aligned with the plate in geometry and thus attached to the top. The flange can be easily positioned on the plate.

In the present method for manufacturing a work vehicle, in the step of positioning, the plate is positioned on the top by a first screw member, and in the step of attaching, a second screw member is used to attach the flange to the top and in doing so the second screw member is not screwed to the plate. This allows the exhaust pipe to be moved relative to the plate and thus registered, and then attached to the top. The exhaust pipe can thus be easily disposed concentrically with the tail pipe with reference to the plate.

Advantageous Effects of Invention

As described above, the present invention can facilitate disposing an exhaust pipe and a tail pipe concentrically and provide better workability in disposing the exhaust pipe and the tail pipe concentrically.

DESCRIPTION OF EMBODIMENTS

Hereinafter, the present invention in an embodiment will be described with reference to the drawings.

Initially will be described a configuration of a work vehicle in one embodiment of the present invention. While hereinafter will be described a wheel loader that is one example of a work vehicle to which the idea of the present invention is applicable, the present invention is also applicable to bulldozers and the like.

Figure 1:
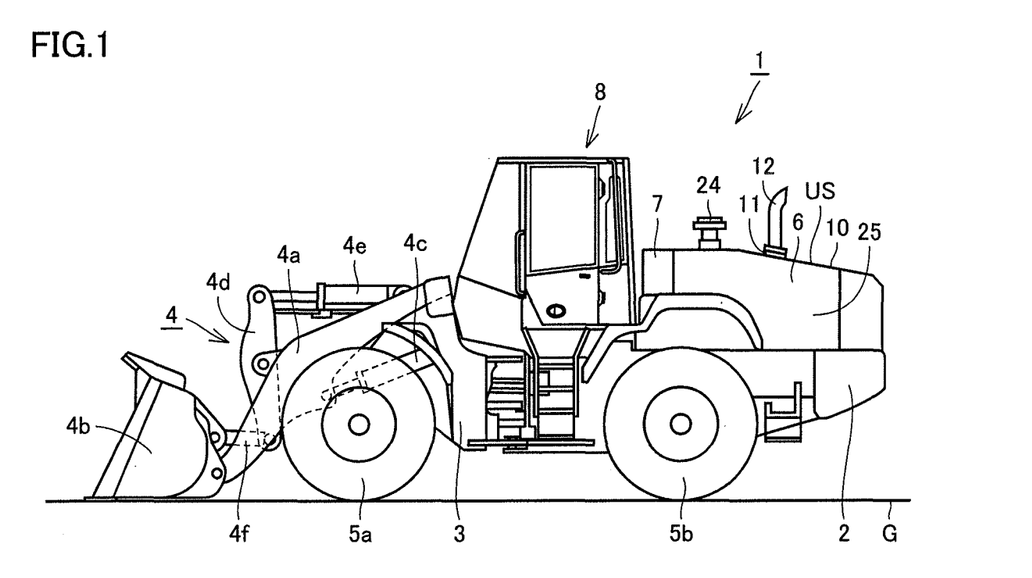
FIG. 1 is a side view schematically showing a configuration of a wheel loader in one embodiment of the present invention.

With reference to FIG. 1, the present embodiment provides a wheel loader 1 having a rear body 2, a front frame 3, and a work implement 4 as main components.

Front frame 3 has opposite side portions each having a front wheel 5a attached thereto and rear body 2 has opposite side portions each having a rear wheel 5b attached thereto.

Rear body 2 and front frame 3 are attached by a center pin (not shown) to be capable of swinging rightward and leftward and thus configure an articulated structure. More specifically, rear body 2 and front frame 3 are coupled by a pair of right and left steering cylinders (not shown) extended and retracted to allow rear body 2 and front frame 3 to swing rightward and leftward around the center pin and thus be steered. Rear body 2 and front frame 3 configure a vehicular body of wheel loader 1.

In front of front frame 3, work implement 4 is attached. Work implement 4 has a boom 4a having a proximal end attached to front frame 3 to swing as desired, and a bucket 4b attached to a distal end of boom 4a to swing as desired. Front frame 3 and boom 4a are coupled by a pair of boom cylinders 4c extended and retracted to cause boom 4a to swing.

Furthermore, work implement 4 has a bell crank 4d supported substantially at its center by boom 4a to swing as desired, a bucket cylinder 4e that couples a proximal end of bell crank 4d and front frame 3 together, and a link 4f that couples a distal end of bell crank 4d and bucket 4b together. Bucket cylinder 4e is extended and retracted to cause bucket 4b to swing.

Behind rear body 2 is disposed an engine compartment 6, and in front of engine compartment 6 is disposed a hydraulic oil tank 7. In front of hydraulic oil tank 7 is disposed a cab 8 in which an operator operates wheel loader 1. Note that wheel loader 1 has front and rear, and right and left sides, which are indicated with reference to the operator seated in cab 8.

Rear body 2 has a top side having a top 10. Top 10 has an inclined upper surface US that is lower toward the vehicular body's rear side when wheel loader 1 is placed on a horizontal ground surface G. An exhaust pipe 12 is attached to top 10 at inclined upper surface US via plate 11.

Figure 2:
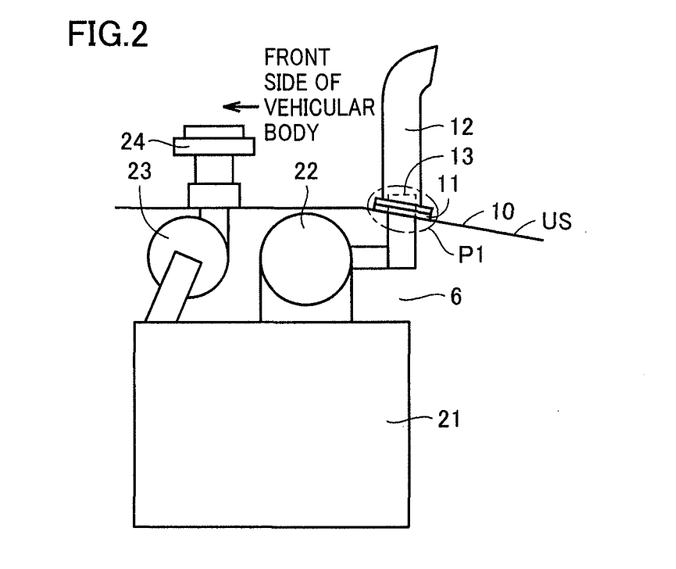
FIG. 2 is a diagram schematically showing a configuration around an engine and an exhaust pipe in one embodiment of the present invention.

With reference to FIG. 1 and FIG. 2, engine compartment 6 has accommodated therein a portion of a tail pipe 13, an engine 21, an exhaust gas processing device (a diesel particulate filter (DPF)) 22, and a suction system filter 23. Exhaust gas processing device 22 and suction system filter 23 are connected to engine 21. Tail pipe 13 is connected to exhaust gas processing device 22. A cap 24 is connected to suction system filter 23. Cap 24 is disposed closer to the vehicular body's front side than exhaust pipe 12. Rear body 2 has a side surface provided with a side door 25.

Figure 3:
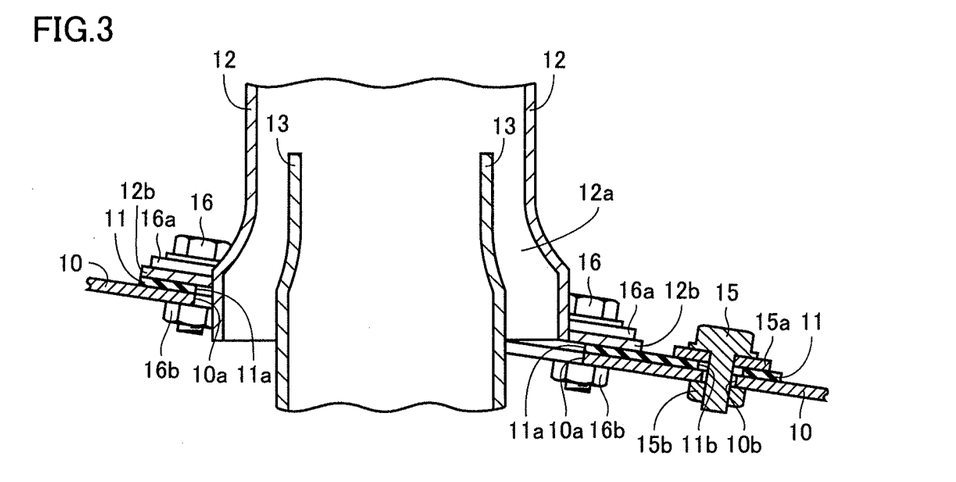
FIG. 3 is an enlarged view showing a portion P1 shown in FIG. 2.

With reference to FIG. 3, plate 11 is disposed on top 10 and exhaust pipe 12 is disposed on plate 11. Top 10 has a first hole 10a and an insertion hole 10b. Plate 11 has a second hole 11a. Plate 11 is attached to top 10 to have second hole 11a in alignment with first hole 10a.

Exhaust pipe 12 is generally cylindrical in geometry. Exhaust pipe 12 has an internal path 12a. Exhaust pipe 12 has a lower end with a flange 12b projecting outward. Flange 12b abuts against plate 11. Exhaust pipe 12 is attached to plate 11 in alignment with first hole 10a and second hole 11a. Tail pipe 13 is generally cylindrical in geometry. Tail pipe 13 has a portion positioned in first hole 10a and second hole 11a. Tail pipe 13 has an end disposed in internal path 12a of exhaust pipe 12.

Figure 4:
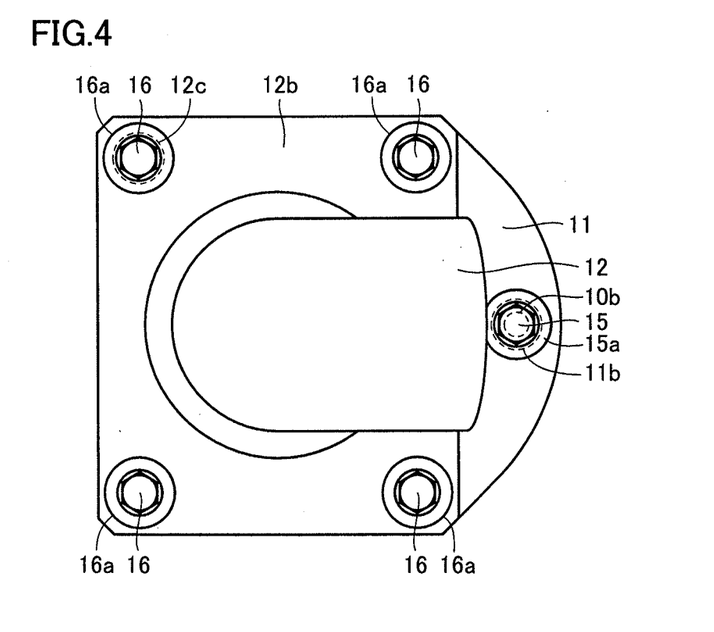
FIG. 4 is a top view schematically showing a configuration around the exhaust pipe in one embodiment of the present invention.

With reference to FIG. 3 and FIG. 4, a first screw member 15 attaches plate 11 to top 10. A second screw member 16 attaches exhaust pipe 12 to top 10 and in doing so second screw member 16 is not screwed to plate 11.

Exhaust pipe 12 has flange 12b in the form of a rectangle as seen in a plane. Exhaust pipe 12 has flange 12b with an insertion hole 12c therethrough for receiving and passing second screw member 16 therethrough. Insertion hole 12c is provided through flange 12b at four corners.

Figure 5:
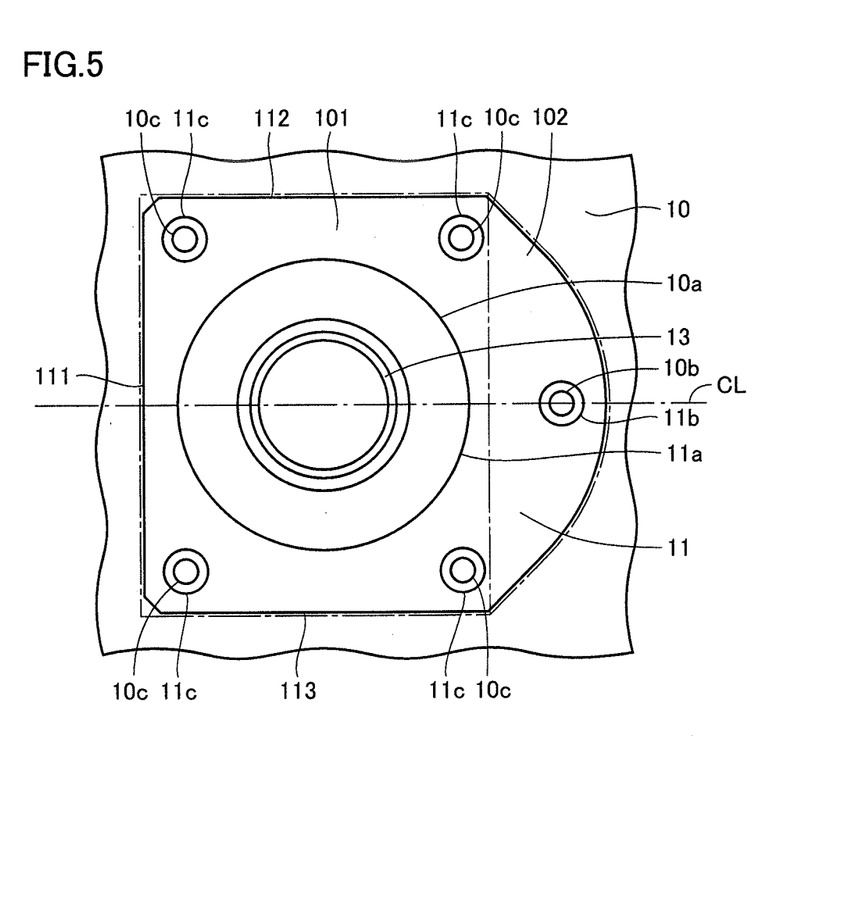
FIG. 5 is a top view schematically showing a plate and a tail pipe in one embodiment of the present invention.

With reference to FIG. 5, plate 11, as seen in a plane, has a rectangular portion 101 and a projection 102 projecting outward arcuately from a long side of rectangular portion 101. Plate 11 has an insertion hole 11b for receiving and passing first screw member 15 therethrough. Insertion hole 11b is provided through projection 102. Plate 11 has an insertion hole 11c for receiving and passing second screw member 16 therethrough. Insertion hole 11c is provided through rectangular portion 101 at four corners.

One insertion hole 11b is provided at a position at which flange 12b does not overlap the head of first screw member 15. Insertion hole 11b is provided on a centerline CL of plate 11. Plate 11 has a first side 111 opposite to insertion hole 11b with second hole 11a posed therebetween and has a second side 112 and a third side 113 adjacent to first side 111 at its opposite ends, respectively.

As shown in FIG. 3 to FIG. 5, first screw member 15 is inserted through insertion hole 11b of plate 11. A washer 15a is disposed between the head of first screw member 15 and plate 11. A nut 15b is screwed to the shank of first screw member 15 on a lower surface of top 10. The first screw member 15 shank has a diameter smaller in dimension than that of insertion hole 10b of top 10 and that of insertion hole 11b of plate 11. Accordingly, plate 11 can be moved with first screw member 15 inserted through insertion hole 11b of plate 11. Note that nut 15b is welded and thus secured to a back surface of top 10.

Second screw member 16 is inserted through insertion hole 10c of top 10, insertion hole 11c of plate 11, and insertion hole 12c of flange 12b. A washer 16a is disposed between the head of second screw member 16 and flange 12b. A nut 16b is screwed to the shank of second screw member 16 on a lower surface of top 10. The second screw member 16 shank has a diameter smaller in dimension than that of insertion hole 10c of top 10 and those of insertion hole 11c of plate 11 and insertion hole 12c of flange 12b. Accordingly, exhaust pipe 12 can be moved with second screw member 16 inserted through insertion holes 10c, 11c, 12c. Note that nut 16b is welded and thus secured to the back surface of top 10.

Flange 12b in the form of a rectangle has three sides aligned with first side 111, second side 112, and third side 113 of plate 11. The plate 11 second hole 11a and tail pipe 13 are disposed concentrically. Thus, tail pipe 13 and exhaust pipe 12 are disposed concentrically.

Plate 11 and exhaust pipe 12 are attached to top 10 at inclined upper surface US that is lower toward the vehicular body's rear side. In that case, exhaust pipe 12 and tail pipe 13 being concentric means that exhaust pipe 12 and tail pipe 13 are concentric when exhaust pipe 12 and tail pipe 13 are seen in a direction in which exhaust pipe 12 and tail pipe 13 extend.

Note that top 10 that is inclined allows better visibility. On the other hand, when exhaust pipe 12 is disposed at inclined upper surface US, it is difficult to dispose exhaust pipe 12 and tail pipe 13 concentrically. In the present embodiment, plate 11 is used as a reference in attaching exhaust pipe 12 to top 10, and this facilitates disposing exhaust pipe 12 and tail pipe 13 concentrically while attaching exhaust pipe 12 to inclined upper surface US.

Figure 6:
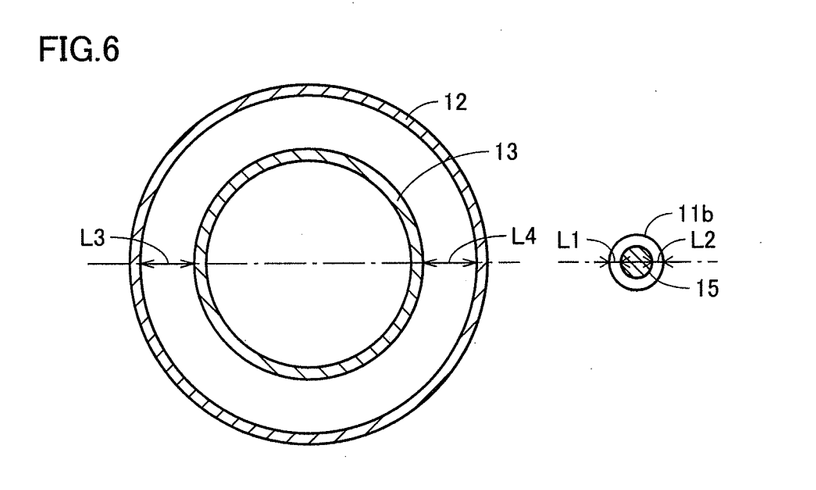
FIG. 6 is a top view schematically showing a positional relationship between the tail pipe and a piping and a positional relationship between a first screw member and an insertion hole in one embodiment of the present invention.

With reference to FIG. 6, the first screw member 15 shank and insertion hole 11b, as seen radially, have an outer diameter and an inner diameter, respectively, with gaps L1 and L2 therebetween. A total of gaps L1 and L2 will serve as a difference between the diameter of first screw member 15 and the diameter of insertion hole 11b. Exhaust pipe 12 and tail pipe 13, as seen radially, have gaps L3 and L4 therebetween. A total of gaps L3 and L4 will serve as a difference between a diameter of internal path 12a of exhaust pipe 12 and an outer diameter of tail pipe 13.

In the present embodiment, insertion hole 11b and first screw member 15 have a difference in diameter having a dimension that can absorb a difference between the outer diameter of tail pipe 13 and the diameter of internal path 12a of exhaust pipe 12. The total of gaps L1 and L2 and the total of gaps L3 and L4 are in effect dimensionally equal or the former is dimensionally slightly larger than the latter.

Figure 7:
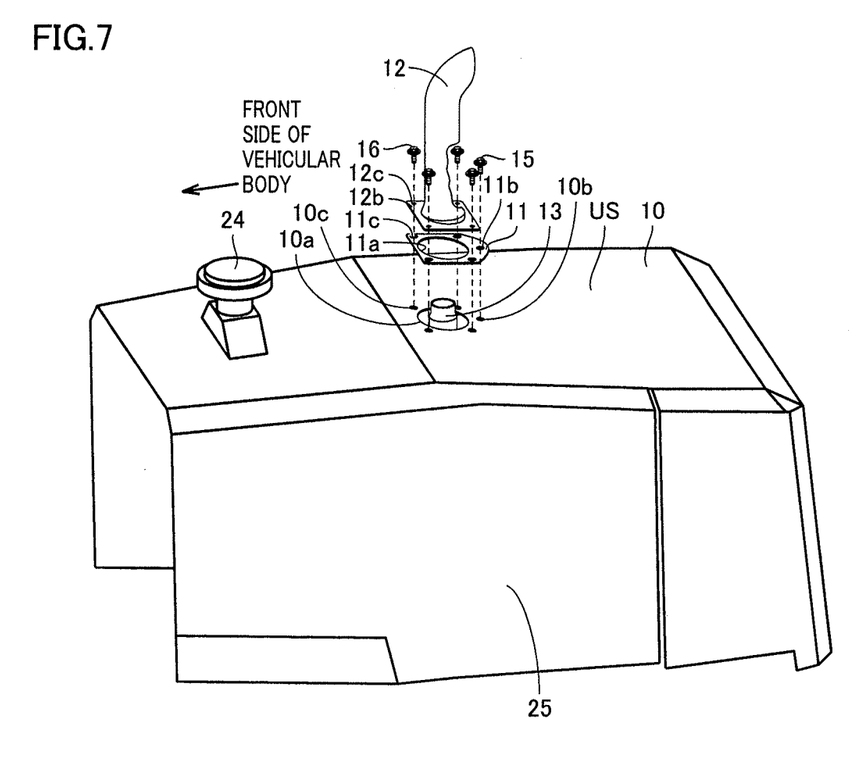
FIG. 7 is an exploded perspective view showing members around the exhaust pipe disassembled and the exhaust pipe partially exploded.

With reference to FIG. 7, plate 11 is disposed between top 10 and flange 12b. Plate 11 is used as a reference in attaching exhaust pipe 12 at flange 12b to top 10. The plate 11 first side 111, second side 112, and third side 113 (see FIG. 5) and rectangular flange 12b's three sides are aligned to dispose plate 11 and flange 12b to overlap each other.

Figure 10:
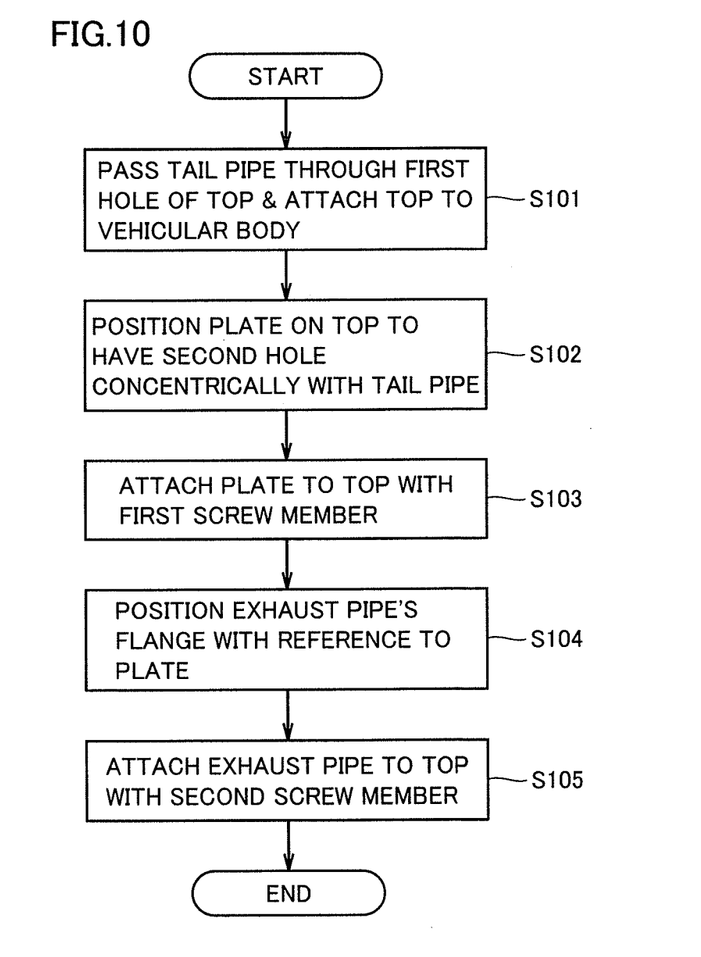
FIG. 10 is a flow chart of the service.

The above described service is provided in a procedure, as will be described hereinafter with reference to the drawings. FIG. 10 is a flow chart of the procedure.

Figure 8:
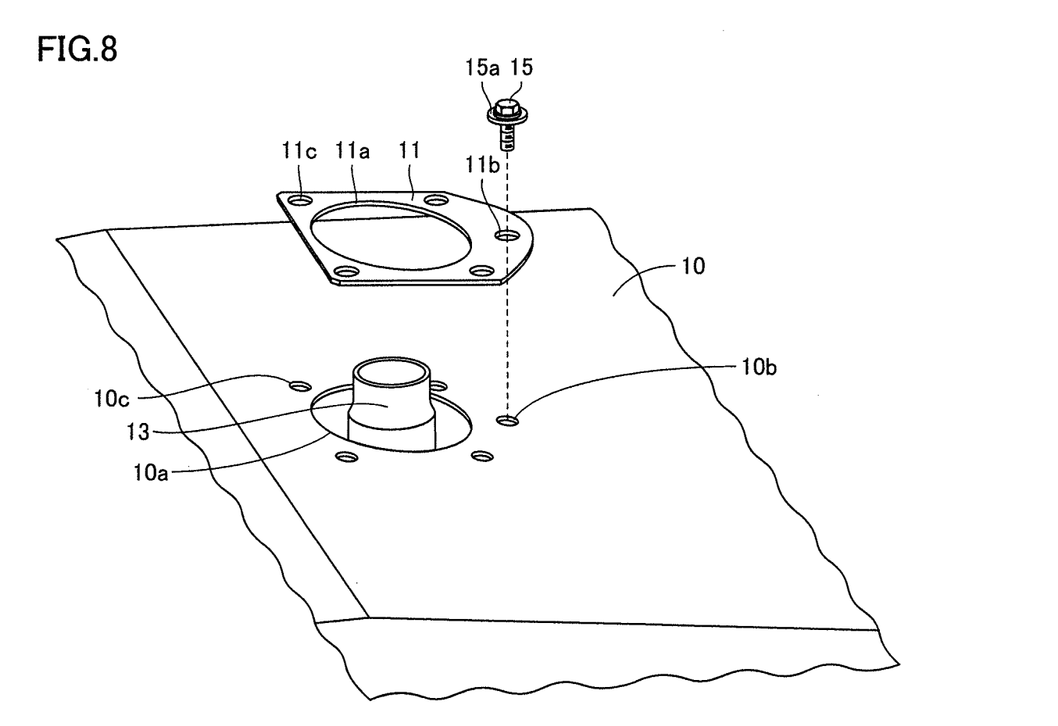
FIG. 8 is a schematic perspective view for illustrating a method for manufacturing a wheel loader in one embodiment of the present invention, showing the top with a first hole, and the tail pipe through the first hole.

With reference to FIG. 8, top 10 has first hole 10a, insertion hole 10b, and insertion hole 10c formed therethrough. In Step S101, tail pipe 13 is passed through first hole 10a of top 10, and top 10 is attached to the vehicular body.

With reference to FIG. 8, plate 11 has second hole 11a, insertion hole 11b, and insertion hole 11c formed therethrough. In Step S102, plate 11 is positioned on top 10 to have second hole 11a concentrically with tail pipe 13.

In Step S103, first screw member 15 is used to secure plate 11 to top 10. First screw member 15 is inserted through insertion hole 10b of top 10 and insertion hole 11b of plate 11 via washer 15a, and screwed to nut 15b (not shown) secured to the back surface of top 10.

In Step S104, exhaust pipe 12 has flange 12b positioned with reference to plate 11. In doing so, flange 12b in the form of a rectangle has three sides aligned with first side 111, second side 112, and third side 113 of plate 11. Exhaust pipe 12 is thus positioned concentrically with tail pipe 13 via plate 11.

Figure 9:
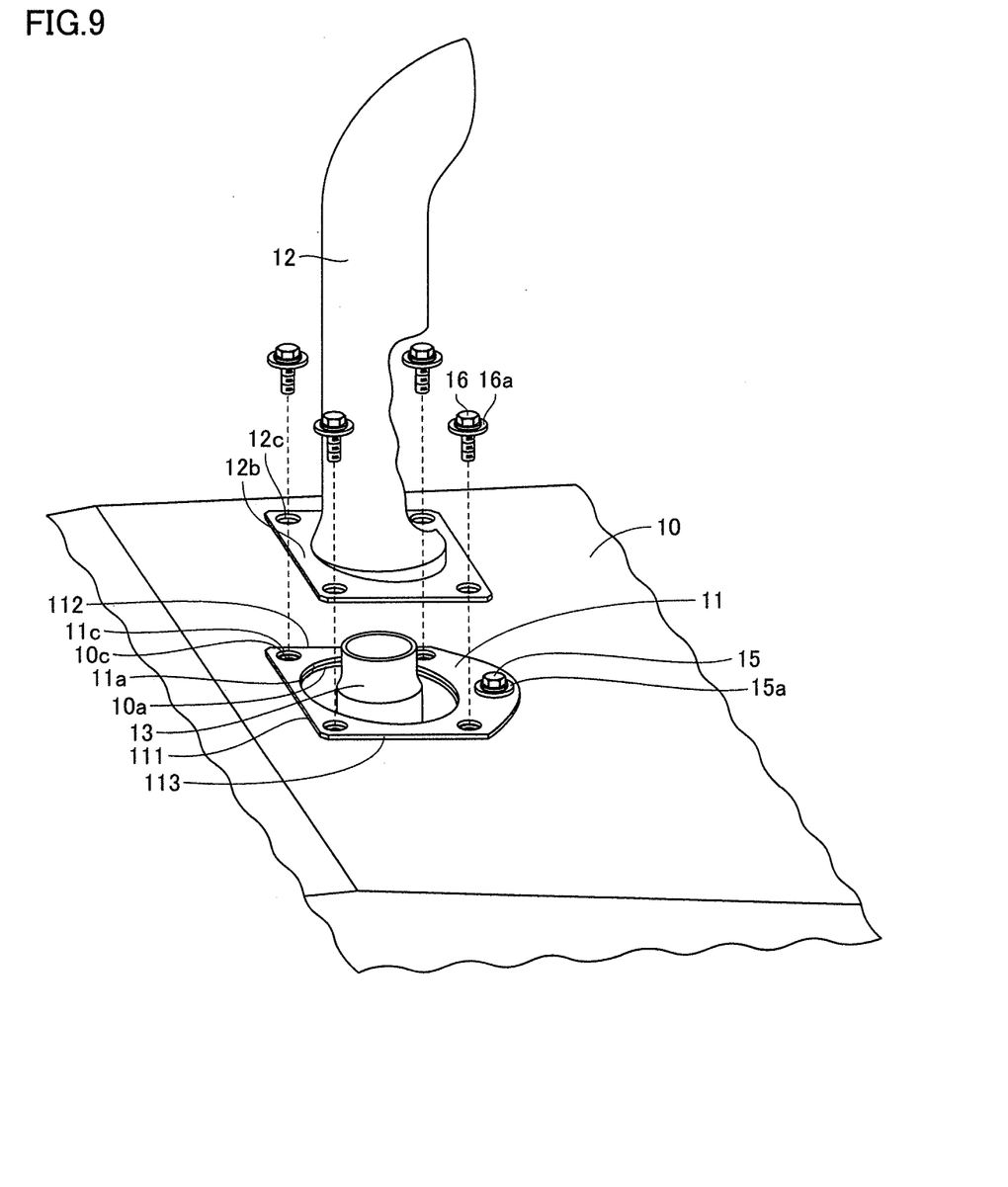
FIG. 9 is a schematic perspective view for illustrating the method for manufacturing a wheel loader in one embodiment of the present invention, showing attaching the exhaust pipe, shown partially exploded, to the top with reference to the plate.

In Step S105, second screw member 15 is used to secure exhaust pipe 12 to top 10. With reference to FIG. 9, first screw member 15 is inserted through insertion hole 10c of top 10, insertion hole 11c of plate 11 and insertion hole 12c of flange 12b via washer 15a, and screwed to nut 16b (not shown) secured to the back surface of top 10. Second screw member 16 thus attaches flange 12b to top 10 and in doing so second screw member 16 is not screwed to plate 11. Then, exhaust pipe 12 is attached to top 10 concentrically with tail pipe 13.

The present embodiment provides a function and an effect, as follows:

The present embodiment provides wheel loader 1 that can eliminate the necessity of opening a side door and requiring two servicepersons to work together to position an exhaust pipe, as plate 11 can serve as a reference to facilitate disposing exhaust pipe 12 and tail pipe 13 concentrically.

The present embodiment provides wheel loader 1 such that, as shown in FIG. 8 and FIG. 9, plate 11 that is disposed between top 10 and flange 12b serves as a reference in attaching flange 12b to top 10, so that while second hole 11a and tail pipe 13 are positioned concentrically, plate 11 is used as a reference in attaching flange 12b to top 10 to facilitate disposing exhaust pipe 12 and tail pipe 13 concentrically. Furthermore, using plate 11 as a reference in attaching flange 12b to top 10 contributes to better workability in disposing exhaust pipe 12 and tail pipe 13 concentrically.

The present embodiment provides wheel loader 1 with second hole 11a and tail pipe 13 disposed concentrically. This allows plate 11 to serve as a reference in attaching flange 12b to top 10 to facilitate disposing exhaust pipe 12 and tail pipe 13 concentrically.

The present embodiment provides wheel loader 1 such that plate 11 and exhaust pipe 12 are attached to top 10 at inclined upper surface US. Plate 11 can thus also serve as a reference to allow exhaust pipe 12 to be attached to inclined upper surface US concentrically with tail pipe 13.

The present embodiment provides wheel loader 1 such that first screw member 15 attaches plate 11 to top 10 and second screw member 16 attaches exhaust pipe 12 to top 10 and in doing so second screw member 16 is not screwed to plate 11. This allows exhaust pipe 12 to be moved relative to plate 11 and thus attached to top 10. Exhaust pipe 12 can thus be easily disposed concentrically with tail pipe 13 with reference to plate 11.

The present embodiment provides wheel loader 1 such that insertion hole 11b and first screw member 15 have a difference in diameter having a dimension that can absorb a difference between the outer diameter of tail pipe 13 and the diameter of internal path 12a of exhaust pipe 12. Exhaust pipe 12 can be moved with first screw member 15 inserted through insertion hole 11b, and tail pipe 13 and exhaust pipe 12 can thus be disposed concentrically.

The present embodiment provides a method for manufacturing wheel loader 1, as follows: plate 11 is positioned on top 10 to have second hole 11a concentrically with tail pipe 13 and exhaust pipe 12 has flange 12b attached to top 10 with reference to plate 11 that has been positioned on top 10 to facilitate disposing exhaust pipe 12 and tail pipe 13 concentrically. Furthermore, using plate 11 as a reference in attaching flange 12b to top 10 contributes to better workability in disposing exhaust pipe 12 and tail pipe 13 concentrically.

The present embodiment provides the method for manufacturing wheel loader 1, as follows: flange 12b is aligned with plate 11 in geometry and thus attached to top 10. Flange 12b can be easily positioned on plate 11.

The present embodiment provides the method for manufacturing wheel loader 1, as follows: plate 11 is positioned on top 10 by first screw member 15 and second screw member 16 is used to attach flange 12b to top 10 and in doing so second screw member 16 is not screwed to plate 11. This allows exhaust pipe 12 to be moved relative to plate 11 and thus registered, and then attached to top 10. Exhaust pipe 12 can thus be easily disposed concentrically with tail pipe 13 with reference to plate 11.

Note that while in the above description tail pipe 13 is connected to exhaust gas processing device 22, tail pipe 13 may be connected to a muffler. Furthermore, while in the above description exhaust gas processing device 22 is a DPF, it may be a device which removes nitrogen oxide and/or the like.

While in the above description flange 12b in the form of a rectangle has three sides aligned with first side 111, second side 112, and third side 113 of plate 11, flange 12b in the form of the rectangle may have two sides aligned with any of first side 111, second side 112, and third side 113. Furthermore, if plate 11 is curved in geometry, flange 12b can be registered along the curved geometry of plate 11.

Furthermore, while in the above description flange 12b is geometrically aligned with plate 11, it may not be done so. More specifically, plate 11 may be provided with a marking and flange 12b may be disposed in alignment therewith.

Furthermore, while in the above description plate 11 is disposed between top 10 and flange 12b and flange 12b is thus attached to top 10, plate 11 may not be disposed. More specifically, plate 11 and flange 12b may be matched in geometry and plate 11 may be used as a reference to provide top 10 with a marking which may in turn be used as a reference in setting flange 12b.

It should be understood that the embodiment disclosed herein is illustrative and non-restrictive in any respect. The scope of the present invention is defined by the terms of the claims, rather than the description above, and is intended to include any modifications within the scope and meaning equivalent to the terms of the claims.

Industrial Applicability

The present invention is advantageously applicable to work vehicles having an exhaust pipe and a method for manufacturing the same.

Reference Signs List

1: wheel loader, 2: rear body; 3: front frame; 4: work implement; 5a: front wheel; 5b: rear wheel; 6: engine compartment; 7: hydraulic oil tank; 8: cab; 10: top; 10a: first hole; 10b, 10c, 11b, 11c, 12, 12c: insertion hole; 11: plate; 11a: second hole; 12: exhaust pipe; 12a: internal path; 12b: flange; 13: tail pipe; 15: first screw member; 15a, 16a: washer; 15b, 16b: nut; 16: second screw member; 21: engine; 22: exhaust gas processing device; 23: suction system filter; 24: cap; 25: side door; 101: rectangular portion; 102: projection; G: ground surface; US: inclined upper surface.

The invention claimed is:

1. A work vehicle comprising:
 a top having a first hole;
 a plate having a second hole and attached to said top with said second hole in alignment with said first hole;
 an exhaust pipe having an internal path and a flange projecting outward and abutting against and thus attached to said plate; and
 a tail pipe having a portion positioned in said first and second holes, and an end in said internal path of said exhaust pipe,
 said plate being disposed between said top and said flange and serving as a reference in attaching said flange to said top,
 said first and second holes being larger than a diameter of said tail pipe in a radial direction of said tail pipe, there being a gap between said tail pipe and each of said first and second holes in the radial direction of said tail pipe.

2. The work vehicle according to claim 1, wherein said second hole and said tail pipe are disposed concentrically.

3. The work vehicle according to claim 1, wherein:
 said top has an upper surface inclined with the work vehicle placed on a horizontal ground surface; and
 said plate and said exhaust pipe are attached to said upper surface inclined.

4. The work vehicle according to claim 1, further comprising first and second screw members, wherein:
 said first screw member attaches said plate to said top; and
 said second screw member attaches said exhaust pipe to said top and in doing so said second screw member is not screwed to said plate.

5. The work vehicle according to claim 4, wherein:
 said plate includes an insertion hole for receiving and passing said first screw member therethrough; and
 said insertion hole and said first screw member have diameters, respectively, having a difference that is equal to a difference between an outer diameter of said tail pipe and a diameter of said internal path of said exhaust pipe.

6. A method for manufacturing a work vehicle, comprising the steps of:
 disposing a top having a first hole and a tail pipe to pass said tail pipe through said first hole;

positioning a plate having a second hole on said top to have said second hole concentrically with said tail pipe; and attaching an exhaust pipe having an outwardly projecting flange to said top at said flange with reference to said plate positioned on said top, said first and second holes being larger than a diameter of said tail pipe in a radial direction of said tail pipe, there being a gap between said tail pipe and each of said first and second holes in the radial direction of said tail pipe.

7. The method for manufacturing a work vehicle according to claim 6, wherein in the step of attaching, said flange is aligned with said plate in geometry and thus attached to said top.

8. The method for manufacturing a work vehicle according to claim 6, wherein:

in the step of positioning, said plate is positioned on said top by a first screw member; and in the step of attaching, a second screw member is used to attach said flange to said top and in doing so said second screw member is not screwed to said plate.

9. The work vehicle according to claim 4, wherein:

said flange is in a form of a rectangle:

said plate has a rectangular portion, a projection projecting outward from said rectangular portion, and an insertion hole provided through said projection for receiving and passing said first screw member therethrough; and said insertion hole is provided at a position at which said flange does not overlap a head of said first screw member.

\* \* \* \* \*